(12) United States Patent
Aikawa et al.

(10) Patent No.: US 9,041,987 B2
(45) Date of Patent: May 26, 2015

(54) IMAGE EVALUATION APPARATUS AND METHOD, IMAGE FORMING SYSTEM, AND NON-TRANSITORY COMPUTER READABLE MEDIUM

(75) Inventors: Kiyofumi Aikawa, Kanagawa (JP); Michio Kikuchi, Kanagawa (JP); Takashi Hiramatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 92 days.

(21) Appl. No.: 13/589,792

(22) Filed: Aug. 20, 2012

(65) Prior Publication Data
US 2013/0242360 A1    Sep. 19, 2013

(30) Foreign Application Priority Data
Mar. 16, 2012   (JP) .................................. 2012-061161

(51) Int. Cl.
*H04N 1/46*   (2006.01)
*H04N 1/00*   (2006.01)
*H04N 1/40*   (2006.01)

(52) U.S. Cl.
CPC ....... *H04N 1/00005* (2013.01); *H04N 1/00047* (2013.01); *H04N 1/40075* (2013.01); *H04N 1/00039* (2013.01); *H04N 1/0005* (2013.01)

(58) Field of Classification Search
USPC .......... 358/504, 530, 296, 512, 514, 1.9, 509, 358/2.1; 348/345, 222.1, 336
See application file for complete search history.

(56) References Cited

U.S. PATENT DOCUMENTS

| 5,852,502 | A | * | 12/1998 | Beckett | .......................... 358/512 |
| 6,421,087 | B1 | | 7/2002 | Ikeda | |
| 2009/0185204 | A1 | * | 7/2009 | Wu et al. | .......................... 358/1.9 |

FOREIGN PATENT DOCUMENTS

| JP | 10-248068 A | 9/1998 |
| JP | 2000-354251 A | 12/2000 |
| JP | 2006-246295 A | 9/2006 |
| JP | 2006-292693 A | 10/2006 |

OTHER PUBLICATIONS

Oki, Image Evaluating Device and Image Forming Device, Oct. 26, 2006, JP 2006292693 A.*
Office Action issued by Australian Patent Office in corresponding Australian Patent Application No. 2012227365 dated Aug. 13, 2013.

* cited by examiner

*Primary Examiner* — Martin Mushambo
(74) *Attorney, Agent, or Firm* — Sughrue Mion, PLLC

(57) ABSTRACT

An image evaluation apparatus includes a reading unit that includes a monochrome detection unit reading, in a focused state, an image formed on a recording material by an image forming apparatus that represents grayscale of the image by forming dots on the recording material, and a color detection unit reading the image in a defocused state; an image information obtaining unit that obtains image information for the image forming apparatus to form the image; a computing unit that computes a luminance and a chroma of an image supposed to be formed on the recording material by the image forming apparatus from the obtained image information; a comparing unit that compares a derived luminance with the computed luminance, and compares a derived chroma with the computed chroma; and an image evaluation unit that evaluates the image formed by the image forming apparatus, on the basis of results of comparison.

9 Claims, 12 Drawing Sheets

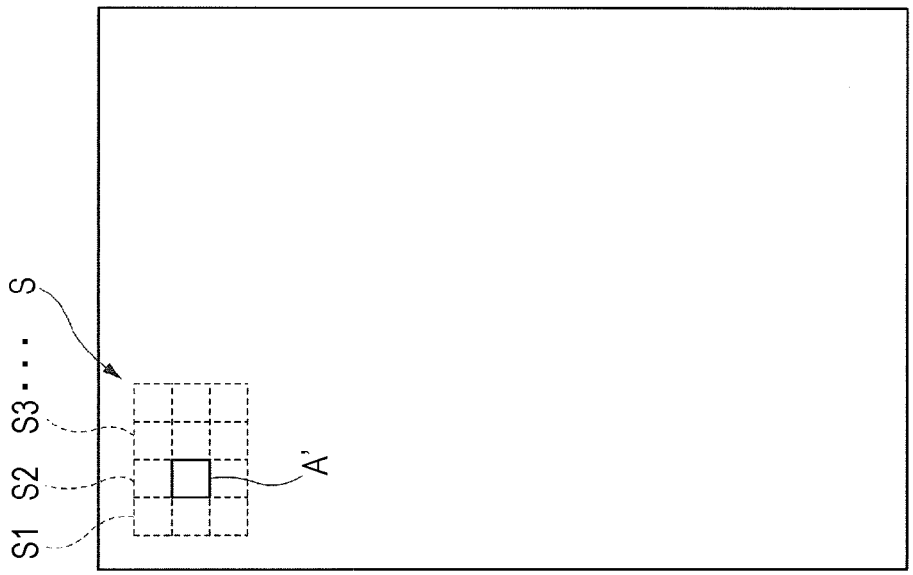
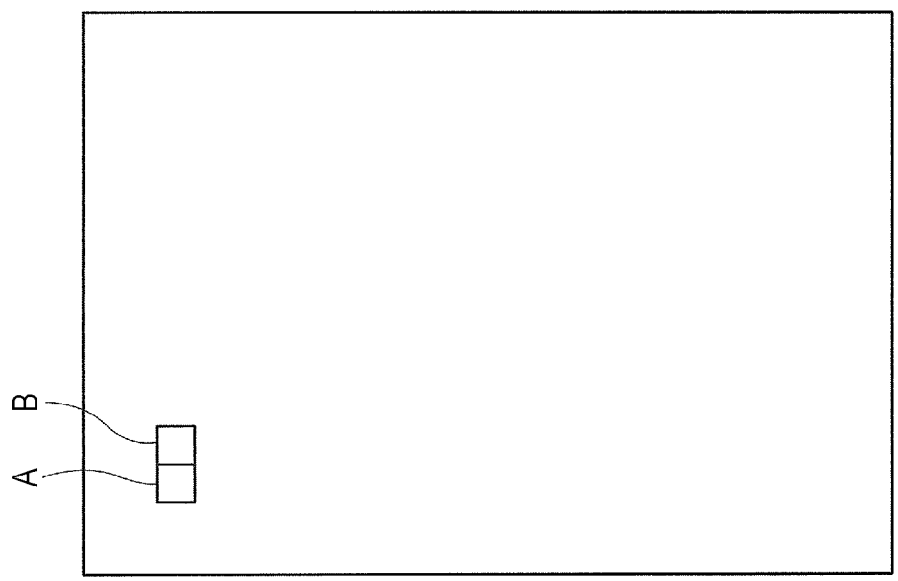

IMAGE EVALUATION APPARATUS AND METHOD, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-061161 filed Mar. 16, 2012.

BACKGROUND (i) Technical Field

The present invention relates to an image evaluation apparatus and method, an image forming system, and a non-transitory computer readable medium.

(ii) Related Art

Hitherto, image reading apparatuses that read image information of a sheet on which an image is formed have been used. The formed image may be evaluated by using this type of image reading apparatus.

There has been technology for reducing, with the use of software processing, moire occurring in the read image obtained by the image reading apparatus.

SUMMARY

According to an aspect of the invention, there is provided an image evaluation apparatus including a reading unit, an image information obtaining unit, a computing unit, a comparing unit, and an image evaluation unit. The reading unit includes a monochrome detection unit and a color detection unit. The monochrome detection unit reads, in a focused state, an image formed on a recording material by an image forming apparatus that performs grayscale representation of the image by forming dots on the recording material. The color detection unit reads the image in a defocused state which is out of the focused state. The image information obtaining unit obtains image information that is information for the image forming apparatus to form the image on the recording material. The computing unit computes a luminance and a chroma of an image supposed to be formed on the recording material by the image forming apparatus from the image information obtained by the image information obtaining unit. The comparing unit compares a luminance derived from the image read by the monochrome detection unit included in the reading unit with the luminance computed by the computing unit, and compares a chroma derived from the image read by the color detection unit with the chroma computed by the computing unit. The image evaluation unit evaluates the image formed by the image forming apparatus, on the basis of results of comparison performed by the comparing unit.

BRIEF DESCRIPTION OF THE DRAWINGS

An exemplary embodiment of the present invention will be described in detail based on the following figures, wherein:

FIGS. 11A and 11B are diagrams describing the details of a method of computing a matching score by using a luminance comparing unit and a chroma comparing unit.

DETAILED DESCRIPTION

Hereinafter, an exemplary embodiment of the present invention will be described in detail with reference to the accompanying drawings.

<Description of Overall Configuration of Image Forming System>

Figure 1:
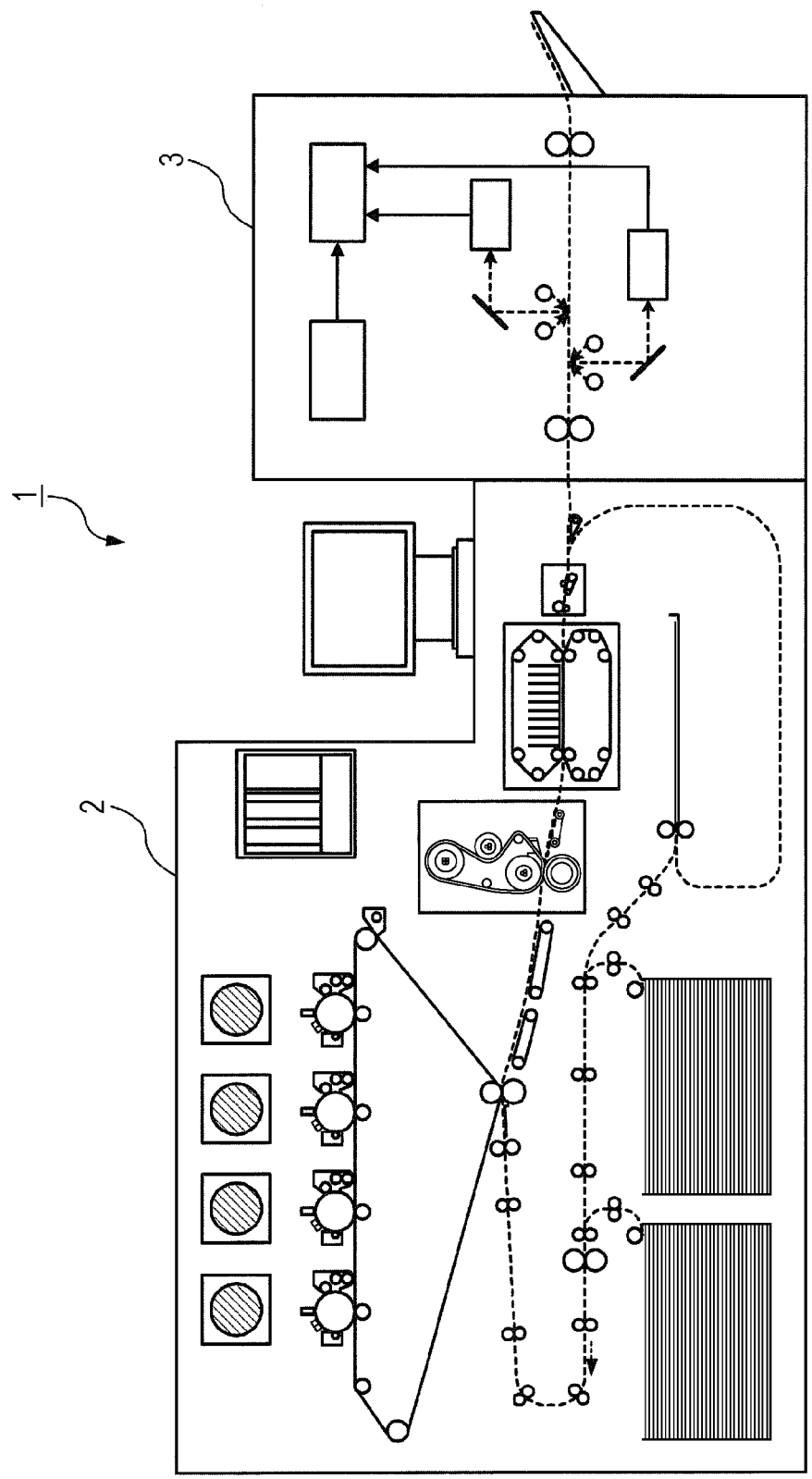
FIG. 1 is a diagram illustrating the overall configuration of an image forming system according to an exemplary embodiment.

FIG. 1 is a diagram illustrating the overall configuration of an image forming system 1 according to an exemplary embodiment of the present invention. The image forming system 1 illustrated in FIG. 1 includes an image forming apparatus 2 such as a printer or a copy machine that forms an image on a recording material by using, for example, an electrophotographic system, and a post-processing apparatus 3 that is an example of an image evaluation apparatus and that evaluates an image on a recording material (such as a sheet) on which the image has been recorded by the image forming apparatus 2.

<Description of Image Forming Apparatus>

Figure 2:
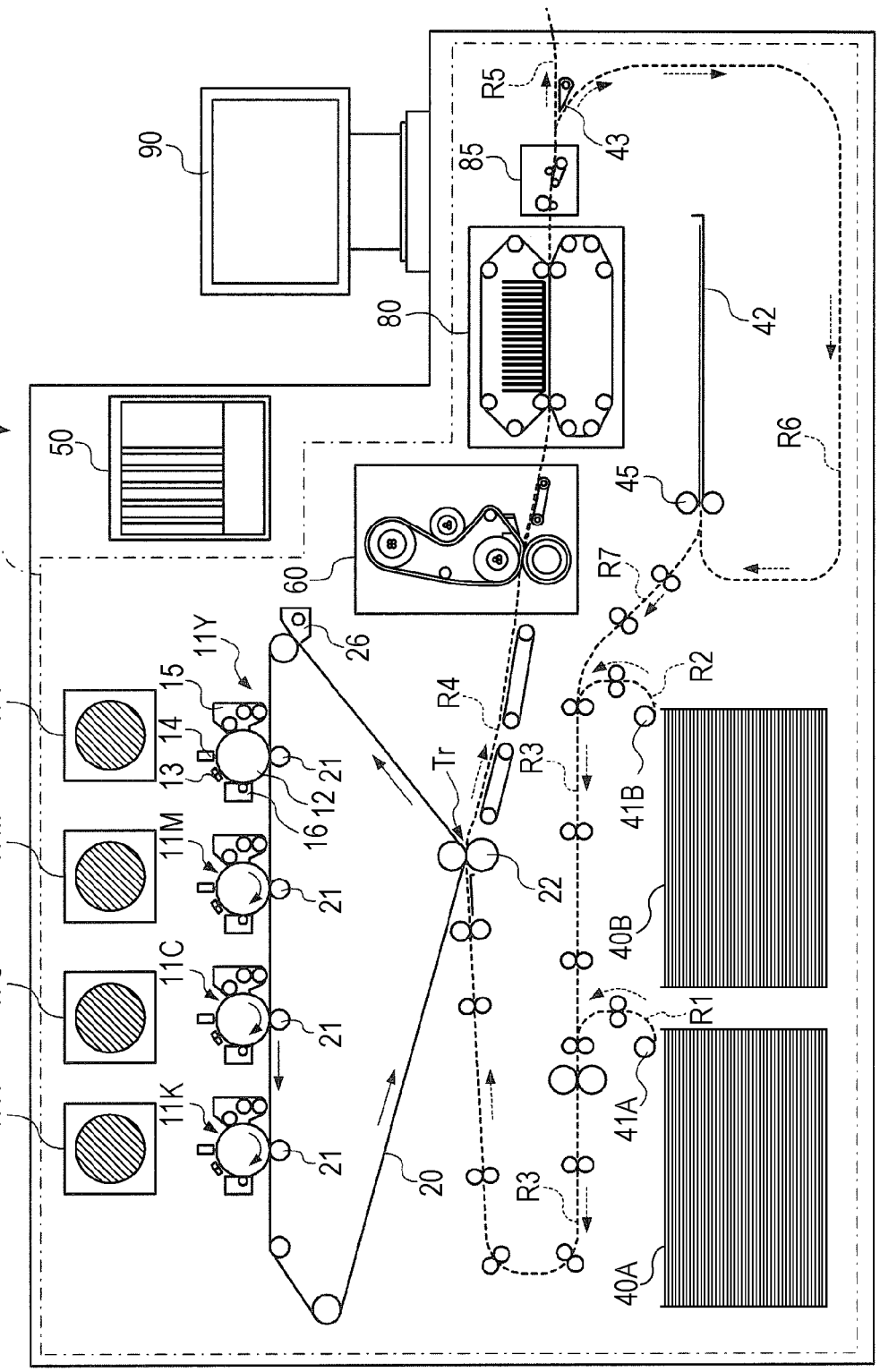
FIG. 2 is a diagram illustrating an image forming apparatus.

FIG. 2 is a diagram describing the image forming apparatus 2.

The image forming apparatus 2 is a so-called "tandem type" color printer. The image forming apparatus 2 includes an image forming device 10 that forms an image based on print data, a main controller 50 that performs the overall control of the operation of the image forming apparatus 2, communication with, for example, a personal computer (PC) or the like, image processing of print data, and the like, and a user interface (UI) device 90 that accepts an operation input from a user and displays various types of information for the user.

<Description of Image Forming Device>

The image forming device 10 is a function part that forms an image by using, for example, an electrophotographic system. The image forming device 10 includes four image forming units 11Y, 11M, 11C, and 11K, which are examples of toner image forming units that are arranged in parallel (hereinafter referred to as "image forming units 11"), an intermediate transfer belt 20 on which the individual color toner images formed on photoconductor drums 12 of the individual image forming units 11 are transferred, and first transfer rolls 21 that transfer (first transfer) the individual color toner images formed on the image forming units 11 to the intermediate transfer belt 20. The image forming device 10 further includes a second transfer roll 22 that collectively transfers (second transfer) the individual color toner images transferred and superposed on one another on the intermediate transfer belt 20 to the sheet, and a fixing unit 60 as an example of a fixing part (fixing device) that fixes the second-transferred individual color toner images on the sheet.

In addition, the image forming device 10 includes a cooling unit 80 as an example of a cooling part that cools the individual color toner images fixed on the sheet by the fixing unit 60 and advances the fixing of the individual color toner images on the sheet, and a curl rectification unit 85 that rectifies the curling of the sheet.

In the image forming apparatus 2 according to the exemplary embodiment, the intermediate transfer belt 20, the first transfer rolls 21, and the second transfer roll 22 constitute a transfer device. Hereinafter, a region in which the second transfer roll 22 is arranged and the individual color toner images on the intermediate transfer belt 20 are second-transferred to the sheet will be referred to as a "second transfer region Tr".

<Description of Image Forming Units>

Each of the image forming units 11 includes, as function parts, for example, the photoconductor drum 12 on which an electrostatic latent image is formed and thereafter a corresponding color toner image is formed, a charging part 13 that charges the surface of the photoconductor drum 12 at a predetermined potential, an exposing part 14 that exposes the photoconductor drum 12, which has been charged by the charging part 13, on the basis of print data, a developing part 15 that develops the electrostatic latent image formed on the photoconductor drum 12 by using a corresponding color toner, and a cleaner 16 that cleans the surface of the photoconductor drum 12 after the image has been transferred.

The developing parts 15 of the individual image forming units 11 are connected to toner containers 17Y, 17M, 17C, and 17K (hereinafter referred to as "toner containers 17") that store the corresponding color toners, with toner transport paths (not illustrated). From the toner containers 17, the individual color toners are supplied to the developing parts 15 with the use of replenishing screws (not illustrated) arranged on the toner transport paths.

The individual image forming units 11 are configured almost similar to one another except for the toners contained in the developing parts 15. The image forming units 11 form a yellow (Y) toner image, a magenta (M) toner image, a cyan (C) toner image, and a black (K) toner image, respectively.

<Description of Sheet Transport System in Image Forming Apparatus>

The image forming device 10 further includes, as a sheet transport system, plural (two in the exemplary embodiment) sheet accommodating containers 40A and 40B that accommodate sheets, feeding rolls 41A and 41B that feed and transport sheets accommodated in the sheet accommodating containers 40A and 40B, a first transport path R1 that transports a sheet from the sheet accommodating container 40A, and a second transport path R2 that transports a sheet from the sheet accommodating container 40B. The image forming device 10 further includes a third transport path R3 that transports sheets from the sheet accommodating containers 40A and 40B toward the second transfer region Tr. In addition, the image forming device 10 includes a fourth transport path R4 that transports a sheet on which the individual color toner images are transferred in the second transfer region Tr so as to pass the fixing unit 60, the cooling unit 80, and the curl rectification unit 85, and a fifth transport path R5 that transports a sheet from the curl rectification unit 85, from an ejection part of the image forming apparatus 2 toward the post-processing apparatus 3.

Transfer rolls and transfer belts are arranged along the first transport path R1 to the fifth transport path R5, and these transfer rolls and transfer belts sequentially transfer sheets that are fed thereto.

<Description of Duplex Transport System>

The image forming system 1 includes, as a duplex transport system, an intermediate sheet accommodating container 42 that temporarily holds a sheet, which has first and second sides, the individual color toner images being fixed by the fixing unit 60 on the first side, a sixth transport path R6 that transports a sheet from the curl rectification unit 85 toward the intermediate sheet accommodating container 42, and a seventh transport path R7 that transports a sheet accommodated in the intermediate sheet accommodating container 42 toward the third transport path R3. The image forming device 10 further includes a sorting mechanism 43 and a feeding roll 45. The sorting mechanism 43 is arranged downstream of the sheet transporting direction of the curl rectification unit 85. The sorting mechanism 43 selectively sorts sheets between the fifth transport path R5, which transports a sheet toward the post-processing apparatus 3, and the sixth transport path R6, which transports a sheet to the intermediate sheet accommodating container 42. The feeding roll 45 feeds a sheet accommodated in the intermediate sheet accommodating container 42 and transports the sheet toward the seventh transport path R7.

<Description of Image Forming Operation>

Referring now to FIG. 2, the basic image forming operation of the image forming apparatus 2 according to the exemplary embodiment will be described.

The individual image forming units 11 of the image forming device 10 form the respective color toner images, namely, Y, M, C, and K color toner images, by using an electrophotographic process using the above-described function parts. The individual color toner images formed by the image forming units 11 are first-transferred one after another by the first transfer rolls 21 onto the intermediate transfer belt 20, thereby forming a composite toner image constituted of the superposed individual color toner images. The composite toner image on the intermediate transfer belt 20 is transported to the second transfer region Tr, in which the second transfer roll 22 is arranged, in accordance with the movement (arrow direction) of the intermediate transfer belt 20.

In contrast, in the sheet transport system, the feeding rolls 41A and 41B rotate in accordance with the start timing of image formation by the image forming units 11, and, for example, one of two sheets from the sheet accommodating containers 40A and 40B, which is specified by the UI device 90, is fed by the feeding roll 41A or 41B. The sheet fed by the feeding roll 41A or 41B is transported along the first transport path R1 or the second transport path R2, and along the third transport path R3, and reaches the second transfer region Tr.

In the second transfer region Tr, with the use of a transfer electric field formed by the second transfer roll 22, the composite toner image held on the intermediate transfer belt 20 is collectively second-transferred to the sheet.

Thereafter, the sheet on which the composite toner image has been transferred becomes separated from the intermediate transfer belt 20, and transported along the fourth transport path R4 to the fixing unit 60. The composite toner image on the sheet transported to the fixing unit 60 undergoes a fixing process by the fixing unit 60 and is fixed on the sheet. The sheet on which the fixed image has been formed is cooled by the cooling unit 80, and the curling of the sheet is rectified by the curl rectification unit 85. Thereafter, the sheet which has gone through the curl rectification unit 85 is led, by the sorting mechanism 43, to the fifth transport path R5 at the time of simplex printing, and is transported toward the post-processing apparatus 3.

Toners that are left on the photoconductor drums 12 after the first transfer (first transfer remaining toners) and toners that are left on the intermediate transfer belt 20 after the second transfer (second transfer remaining toners) are removed by the cleaners 16 and a belt cleaner 26, respectively.

In contrast, at the time of duplex printing, after a sheet with the first side on which the fixed image has been formed by the above-described process passes the curl rectification unit 85, the sheet is led by the sorting mechanism 43 to the sixth transport path R6 and is transported along the sixth transport path R6 toward the intermediate sheet accommodating container 42. Again, the feeding roll 45 rotates in accordance with the start timing of image formation on the second side by the image forming units 11, and the sheet is fed from the intermediate sheet accommodating container 42. The sheet that has been fed by the feeding roll 45 is transported along the seventh transport path R7 and the third transport path R3, and reaches the second transfer region Tr.

In the second transfer region Tr, as in the case of the first side, with the use of a transfer electric charge formed by the second transfer roll 22, the individual color toner images on the second side, which are held on the intermediate transfer belt 20, are collectively second-transferred to the sheet.

The sheet with two sides on which the toner images are formed are fixed by the fixing unit 60, as in the case of the first side, and cooled by the cooling unit 80, and the curling of the sheet is rectified by the curl rectification unit 85. Thereafter, the sheet which has gone through the curl rectification unit 85 is led, by the sorting mechanism 43, to the fifth transport path R5, and is transported toward the post-processing apparatus 3.

In this manner, an image forming process performed by the image forming apparatus 2 is repeated the number of cycles which is the number of prints.

<Description of Signal Processing System>

Figure 3:
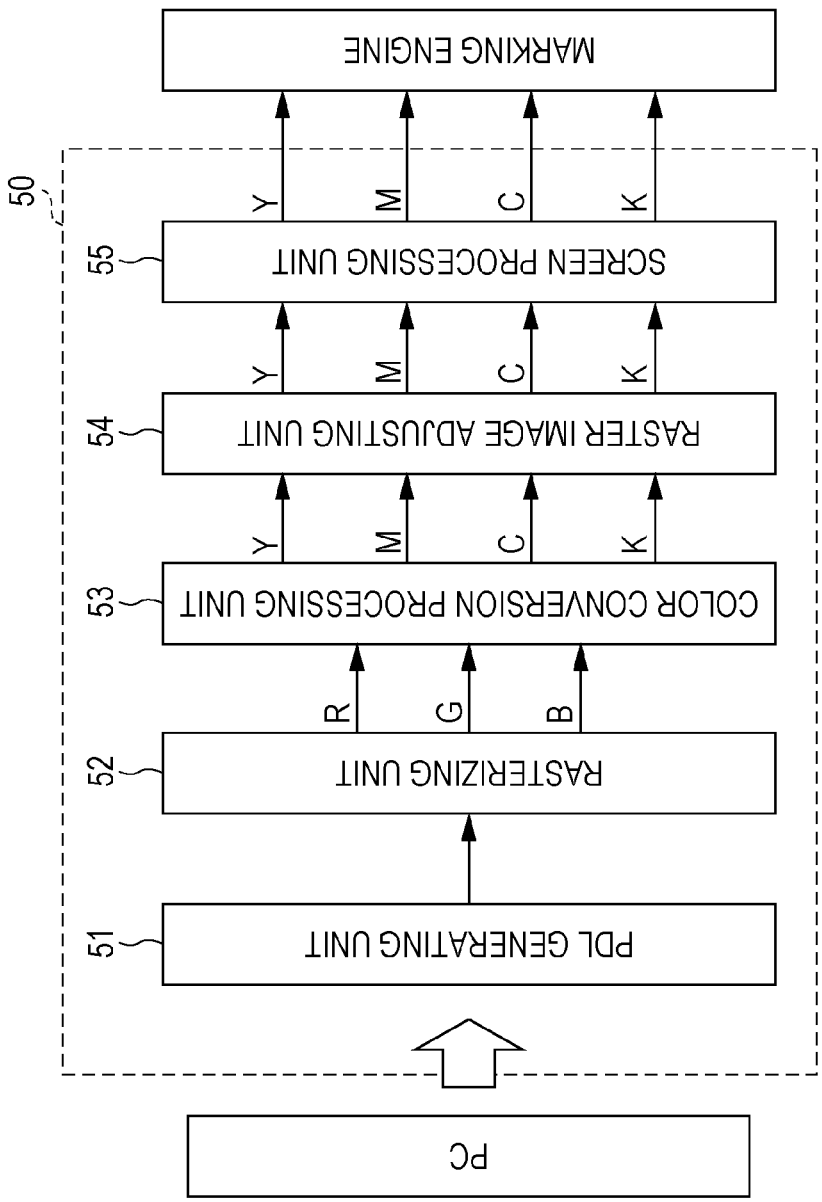
FIG. 3 is a block diagram illustrating a signal processing system as an image processing unit in a main controller of the image forming apparatus.

FIG. 3 is a block diagram illustrating a signal processing system of the main controller 50 of the image forming apparatus 2.

FIG. 3 illustrates not only the signal processing system of the main controller 50, but also illustrates a personal computer (PC) that is an external apparatus outside the image forming apparatus 2, and a marking engine that forms an image based on an image signal processed by the signal processing system. The marking engine corresponds to, for example, in the image forming apparatus 2 illustrated in FIG. 2, each mechanism that actually forms an image. In this example, the image forming apparatus 2 is configured as a printer. Hereinafter, the flow of a process regarding an image signal will be described with reference to FIG. 3.

The main controller 50 includes a page description language (PDL) generating unit 51 that receives print data and converts the print data into data in a PDL format, a rasterizing unit 52 that generates a raster image from the PDL data generated by the PDL generating unit 51, a color conversion processing unit 53 that converts RGB data into YMCK data, a raster image adjusting unit 54 that adjusts a raster image obtained by conversion performed by the color conversion processing unit 53, and a screen processing unit 55 that performs screen processing.

In the exemplary embodiment, the PDL generating unit 51 receives print data from the PC. The print data is data of an image that a user of the PC wants to print with the image forming apparatus 2. Upon receipt of the print data, the PDL generating unit 51 converts the print data into code data written in a PDL and outputs the code data.

The rasterizing unit 52 converts the code data written in a PDL, which is output from the PDL generating unit 51, into raster data on a pixel by pixel basis, thereby obtaining a raster image. The rasterizing unit 52 outputs the raster data obtained by the conversion as red, green, and blue video data (RGB video data). At this time, the rasterizing unit 52 outputs the RGB data on a page by page basis.

The color conversion processing unit 53 converts the RGB data input from the rasterizing unit 52 into device-independent color values such as [XYZ], [L*a*b*], or [L*u*v*], converts the color values into YMCK data, namely, yellow (Y), magenta (M), cyan (C), and black (K) that are colors that may be represented by the image forming apparatus 2, and outputs the YMCK data. The YMCK data is constituted of Y color data, M color data, C color data, and K color data, which are separated on a color by color basis.

The raster image adjusting unit 54 performs various adjustments so that an image of higher quality may be obtained at the image forming apparatus 2 by performing, for example, γ conversion, fineness processing, and halftone processing of the YMCK data input from the color conversion processing unit 53.

The screen processing unit 55 performs screen processing of image information by using a screen that has a predetermined threshold arrangement in a main scanning direction and a sub scanning direction.

The image forming apparatus 2 according to the exemplary embodiment adopts an area ratio grayscale method that performs grayscale representation of the individual colors including yellow (Y), magenta (M), cyan (C), and black (K) by changing the areas of images in the individual colors. To form an image using the area ratio grayscale method, an image to be formed is subjected to screen processing on a color by color basis, thereby forming a dot image. These dot images in the individual colors are superimposed to form a full-color image. That is, an image formed with the area ratio grayscale method is basically a collection of dots.

Figure 4:
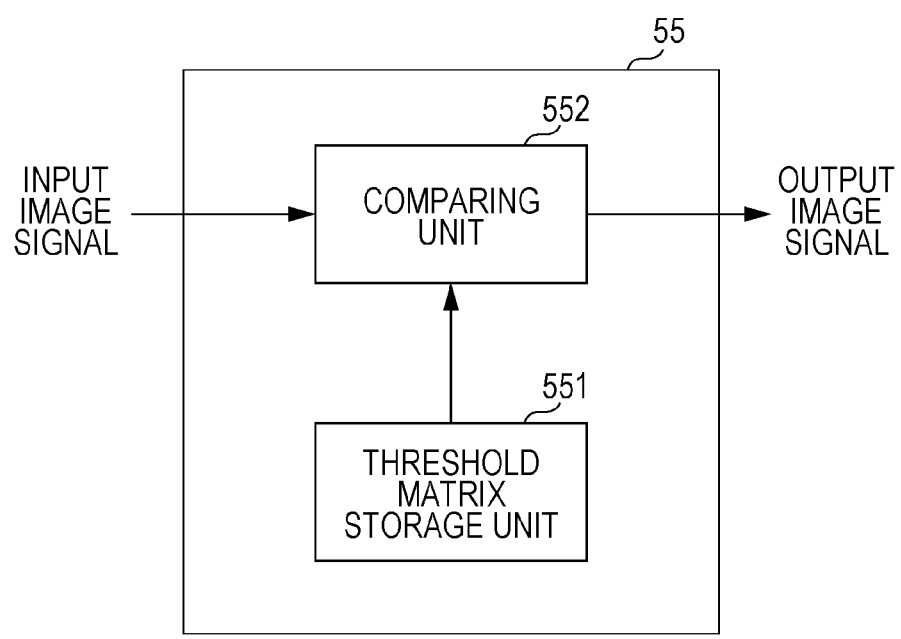
FIG. 4 is a diagram illustrating a screen processing unit in more detail.

FIG. 4 is a diagram illustrating the screen processing unit 55 in more detail.

As illustrated in FIG. 4, the screen processing unit 55 includes a threshold matrix storage unit 551 and a comparing unit 552.

In the threshold matrix storage unit 551, thresholds arranged in a matrix in the main scanning direction and the sub scanning direction are stored. These thresholds are read out from the threshold matrix storage unit 551 to the comparing unit 552. The value of each pixel of an input image signal is compared by the comparing unit 552 with a threshold corresponding to that pixel. When the value of that pixel of the input image signal is greater than or equal to the corresponding threshold (the pixel of the input image signal≤the corresponding threshold), "1" is output as the value of a corresponding pixel of an output image signal. In contrast, when the value of that pixel of the input image signal is less than the corresponding threshold (the pixel of the input image signal>the corresponding threshold), "0" is output as the value of the corresponding pixel of the output image signal. Accordingly, grayscale based on the area ratio grayscale method is represented.

Figure 5A:
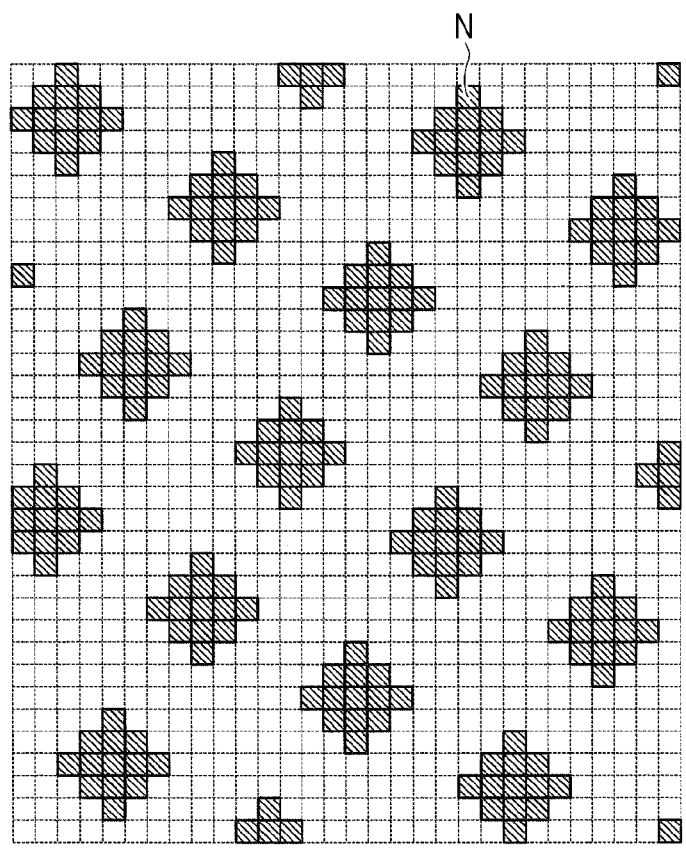
FIGS. 5A and 5B illustrate an example of an image formed when screen processing is performed using an area ratio grayscale method.
Figure 5B:
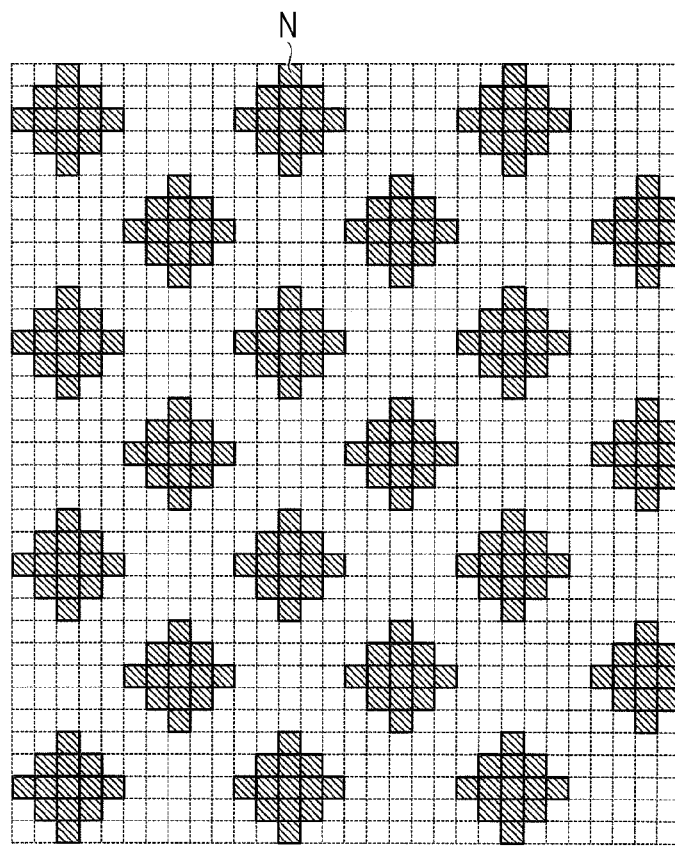

FIGS. 5A and 5B illustrate an example of an image formed when screen processing is performed with the area ratio grayscale method.

FIG. 5A depicts an example in which a screen with a screen angle of 60 degrees is used. That is, dots N to be formed are arranged with a tilt of 60 degrees with respect to the main scanning direction. Further, the black-to-white pixel ratio in this image is 13:37.

FIG. 5B depicts an example in which a screen with a screen angle of 45 degrees is used. In this case, dots N to be formed are arranged with a tilt of 45 degrees with respect to the main scanning direction. The black-to-white pixel ratio in this image is also 13:37.

<Description of Post-Processing Apparatus>

Figure 6:
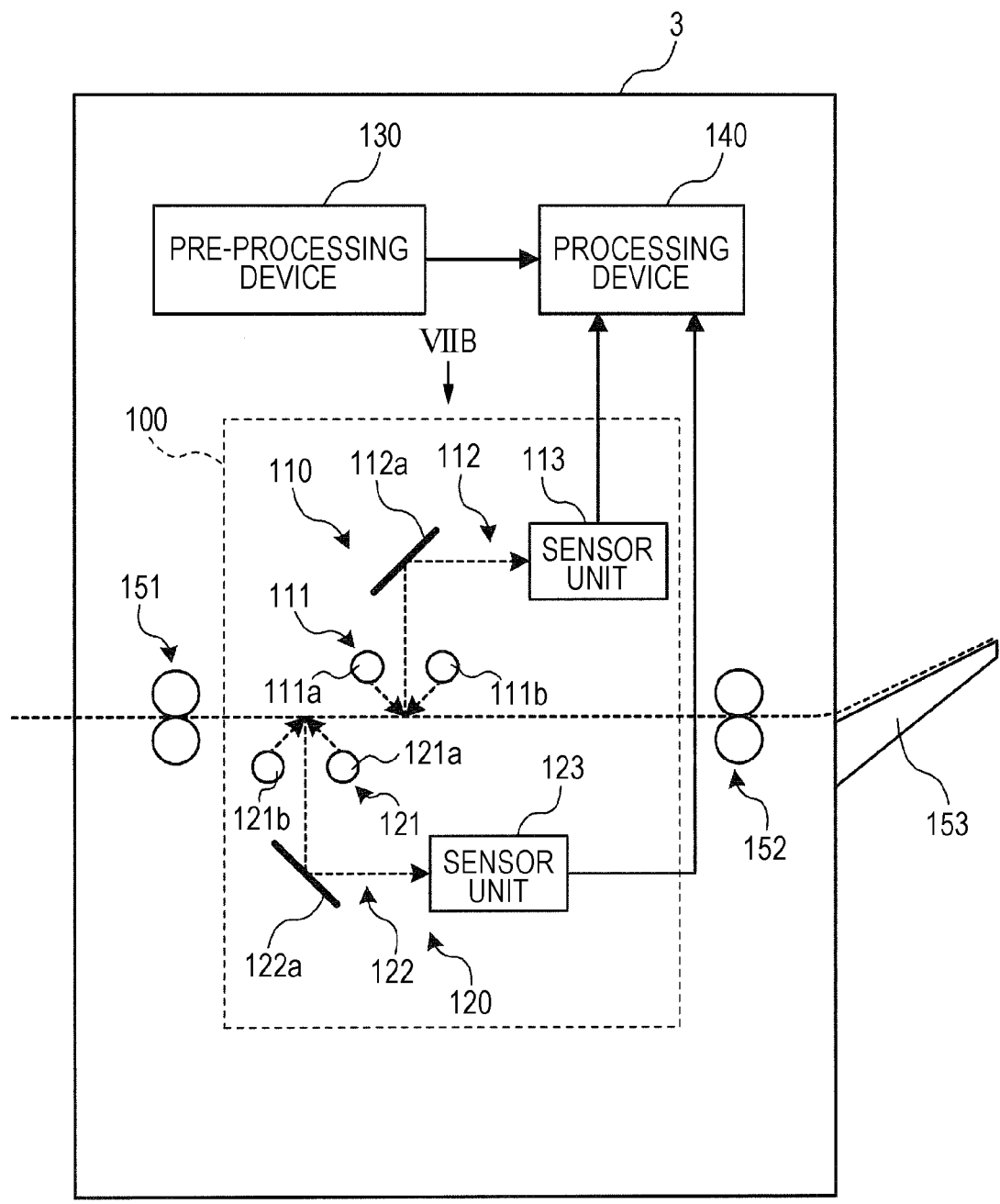
FIG. 6 is a diagram describing a post-processing apparatus according to the exemplary embodiment.

FIG. 6 illustrates the post-processing apparatus 3 according to the exemplary embodiment.

The post-processing apparatus 3 illustrated in FIG. 6 includes a reading device 100 as an example of a reading unit that reads a sheet on which an image is formed by the image forming apparatus 2, a pre-processing device 130 as an example of an image information obtaining unit that obtains print data, which is an example of image information that is information for the image forming apparatus 2 to form an image on a sheet, and a processing device 140 that performs evaluation processing of an image formed by the image forming apparatus 2.

The post-processing apparatus 3 further includes a transport roll 151 that transports a sheet fed from the image forming apparatus 2 to the reading device 100, a transport roll 152 that further transports a sheet on which an image has been read and ejects the sheet, and a tray 153 on which the ejected sheet is placed.

<Description of Reading Device>

In the exemplary embodiment, the reading device 100 is capable of reading both sides, namely, the front side and the back side, of a sheet at one transport. To realize this, the reading device 100 includes a front-side reading unit 110 that is arranged in an upper region in FIG. 6, which is the direction of the front side of the sheet, and that reads an image formed on the front side of the sheet, and a back-side reading unit 120 that is arranged in a lower region in FIG. 6, which is the direction of the back side of the sheet, and that reads an image formed on the back side of the sheet.

The front-side reading unit 110 includes a light source 111 that emits light towards a sheet on which an image is formed, an optical system 112 that leads light reflected from the sheet, and a sensor unit 113 that converts the light led by the optical system 112 into an electrical signal. The back-side reading unit 120 has a configuration similar to that of the front-side reading unit 110. The back-side reading unit 120 includes a light source 121 corresponding to the light source 111, an optical system 122 corresponding to the optical system 112, and a sensor unit 123 corresponding to the sensor unit 113.

Hereinafter, the front-side reading unit 110 will be described. However, the same or similar description applies to the back-side reading unit 120.

The light source 111 includes, for example, a pair of straight xenon fluorescent lamps 111a and 111b. The light source 111 emits light to a sheet that passes along a transport face, and generates reflection light as information of an image formed on the sheet.

In the exemplary embodiment, because the light source 111 includes a pair of xenon fluorescent lamps 111a and 111b, even when a sheet is transported with a tilt with respect to the transport face, luminance of light emitted to the sheet is less likely to vary. That is, when there is only one xenon fluorescent lamp, luminance of light emitted to the sheet varies easily at the time the sheet becomes tilted. In this case, the image may not be normally read.

The optical system 112 causes light reflected from the sheet to be led to the sensor unit 113 with the use of reflection from a mirror 112a. Although not illustrated in FIG. 6, the optical system 112 has a configuration described in detail below with reference to FIGS. 7A and 7B.

Figure 7A:
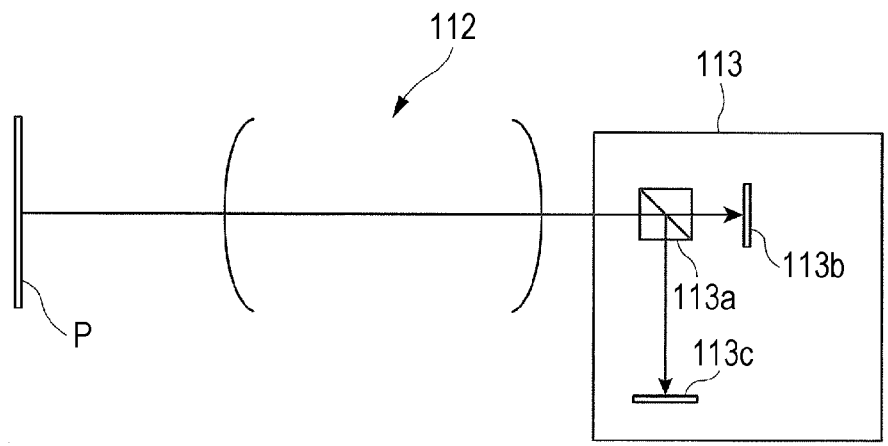
FIGS. 7A and 7B are diagrams describing an optical system in more detail.
Figure 7B:
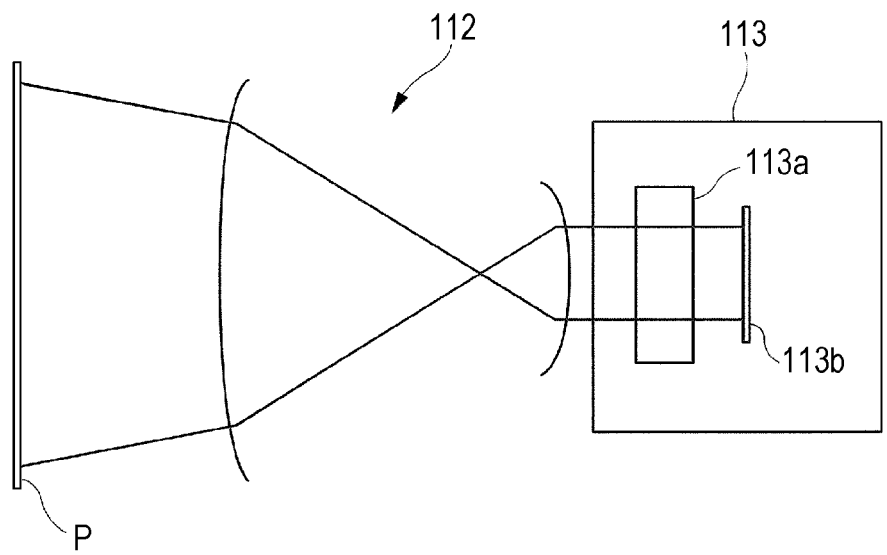

FIGS. 7A and 7B illustrate the optical system 112 in more detail.

To simplify the description, the optical system 112 in FIGS. 7A and 7B is illustrated as that has no mirror 112a.

FIG. 7A illustrates the case in which the optical system 112 is viewed in the same direction as that in FIG. 6. FIG. 7B illustrates the case in which the optical system 112 is viewed in the VIIb direction in FIG. 6.

Referring to FIGS. 7A and 7B, light reflected from a sheet P passes through the optical system 112 and enters the sensor unit 113. At this point, as illustrated in FIG. 7B, light that has passed through the optical system 112 is substantially parallel to the optical axis. That is, the optical system 112 is such that an image side is a telecentric optical system. By configuring the optical system 112 in this manner, there is an advantage that optical errors including magnification errors are less likely to occur, which will be described later in more detail.

FIGS. 7A and 7B additionally illustrate the configuration of the sensor unit 113.

The sensor unit 113 includes a beam splitter 113a as an example of a splitting unit that splits light from a sheet that has passed through the optical system 112 into light beams in two directions, a monochrome sensor 113b as an example of a monochrome detection unit onto which one of the beams of light split by the beam splitter 113a is incident, and which reads the brightness of the image formed on the sheet P, and a color sensor 113c an example of a color detection unit onto which the other one of the beams of light split by the beam splitter 113a is incident, and which reads the hue of the image formed on the sheet P.

In the exemplary embodiment, the monochrome sensor 113b and the color sensor 113c are both sensors with charge coupled devices (CCDs). Using the CCDs, the monochrome sensor 113b and the color sensor 113c perform photoelectric conversion of the incident light into electric charge and generate electrical signals.

In the exemplary embodiment, the monochrome sensor 113b and the color sensor 113c are line sensors in which the CCDs are arranged in lines. When the sheet P is transported, the monochrome sensor 113b and the color sensor 113c sequentially read the image on a line by line basis in accordance with the movement of the sheet P. An electrical signal generated by the monochrome sensor 113b is output as a luminance signal. The color sensor 113c is capable of measuring the individual RGB colors of the image recorded on the sheet P because the color sensor 113c has CCDs corresponding to the individual RGB colors, which are arranged in three lines. That is, the color sensor 113c includes 3-line color CCDs. Therefore, electrical signals generated by the color sensor 113c are output as R, G, and B color signals.

Here, when the image formed on the sheet P is read, moire may occur in the read image.

One of the causes that may give rise to this moire is the existence of dots formed on the sheet P in order to perform grayscale representation of the image. That is, frequency interference occurs between the arrangement of dots formed on the sheet P and the structure of CCD pixels, and this frequency interference may give rise to moire.

Related art that suppresses this moire includes technology that performs software processing on the read image.

For example, this is performed in the following steps.

(i) The image formed on the sheet P is read at a resolution that is twice or higher the resolution desired to be achieved in the end.

(ii) The read image is subjected to Gaussian filtering, thereby blurring the dots of the image.

(iii) The read image is converted into an image at the desired resolution. This is performed by, for example, a Bicubic method.

(iv) After the resolution conversion, the image is subjected to unsharp masking, thereby emphasizing the contour.

However, the method of performing software processing on a read image in the above manner is not effective for all images since some images are unsuitable for the method. The number of lines of dots formed on the sheet P is not necessarily uniform, and there may be images including a mixture of dots with various numbers of lines. In this case, the method of performing software processing is not a suitable method. Since it is necessary to read the image formed on the sheet P at a high resolution, the burden on the reading sensor is heavy, and the processing speed tends to be slow.

In the exemplary embodiment, the phenomenon in which moire occurs in a read image is suppressed by using the following method.

In the exemplary embodiment, the monochrome sensor 113b is arranged at a best focused position at which the focus of the optical system 112 is achieved, and the color sensor 113c is arranged at a defocused position at which the state of focus is out of focus of the optical system 112. This may be performed by making the optical path length of a beam of light led by the beam splitter 113a to the monochrome sensor 113b different from the optical path length of a beam of light led by the beam splitter 113a to the color sensor 113c. It exemplary embodiment, as illustrated in FIG. 7A, the color sensor 113c is positioned at a further distance than the monochrome sensor 113b from the beam splitter 113a. Accordingly, the beam led to the color sensor 113c has a longer optical path length than that led to the monochrome sensor 113b.

It is preferable to position the color sensor 113c so that the minimum frequency of a screen used to form an image becomes a modulation transfer function (MTF) value of the optical system 112.

By arranging the color sensor 113c at a defocused position in this manner, high frequency components of the read image are removed, thereby suppressing, for example, frequency interference between the arrangement of dots formed on the sheet P in order to perform grayscale representation of the image and the structure of CCD pixels. The occurrence of moire in the read image, which is caused by this frequency interference, may be suppressed. Thus, a grayscale image may be evaluated with a higher accuracy.

At the same time, to evaluate a line drawing such as a character, an image read by the monochrome sensor 113b in a best focused state is used. Accordingly, an image constituted of a line drawing may be evaluated with a higher accuracy.

At this point, since the optical system 112 is an image-side telecentric optical system, a magnification difference is less likely to occur even when the monochrome sensor 113b and the color sensor 113c are arranged at positions at which the optical path lengths from the sheet P are different. Therefore, the accuracy of image evaluation tends to be higher, which will be described later. Further, the structure of the optical system 112 is simplified, and there is an advantage that the degree of difficulty in optical adjustment is low.

<Description of Pre-Processing Device>

Figure 8:
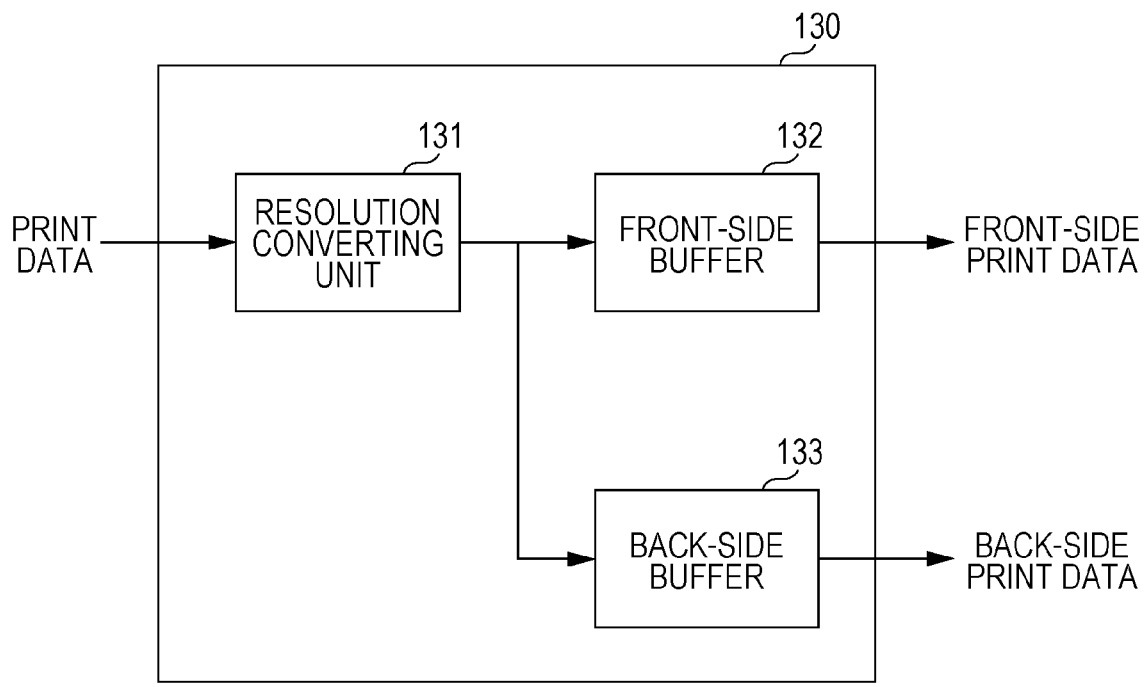
FIG. 8 is a diagram describing a pre-processing device.

FIG. 8 is a diagram describing the pre-processing device 130.

As illustrated in FIG. 8, the pre-processing device 130 includes a resolution converting unit 131 that obtains, from the image forming apparatus 2, print data that is information for the image forming apparatus 2 to form an image on a sheet, and converts the resolution of the print data, a front-side buffer 132 that temporarily accumulates a front-side portion of the print data whose resolution has been converted by the resolution converting unit 131, and a back-side buffer 133 that temporarily accumulates a back-side portion of the print data.

The print data obtained by the resolution converting unit 131 is print data of the individual Y, M, C, and K colors that have been screen-processed by the screen processing unit 55 illustrated in FIG. 3. The resolution converting unit 131 converts the obtained print data into data at a resolution suitable for the processing device 140 to evaluate an image, which will be described later. For example, when the obtained print data has a resolution of 600 dots per inch (dpi), the resolution converting unit 131 converts the print data into data at a resolution of 300 dpi.

The resolution is downconverted because the post-processing apparatus 3 according to the exemplary embodiment is desired to have a high processing speed when evaluating an image. By donwconverting the resolution, the burden on the processing device 140 is reduced, which will be described later. Even when the resolution is downconverted to 300 dpi, this resolution or 300 dpi is sufficiently high enough for evaluating a line drawing. Thus, resolution downconversion is less likely to influence the evaluation of a line drawing.

In response to reading of an image formed on a sheet by the reading device 100, the front-side buffer 132 and the back-side buffer 133 send print data corresponding to the image to the processing device 140.

<Description of Processing Device>

Figure 9:
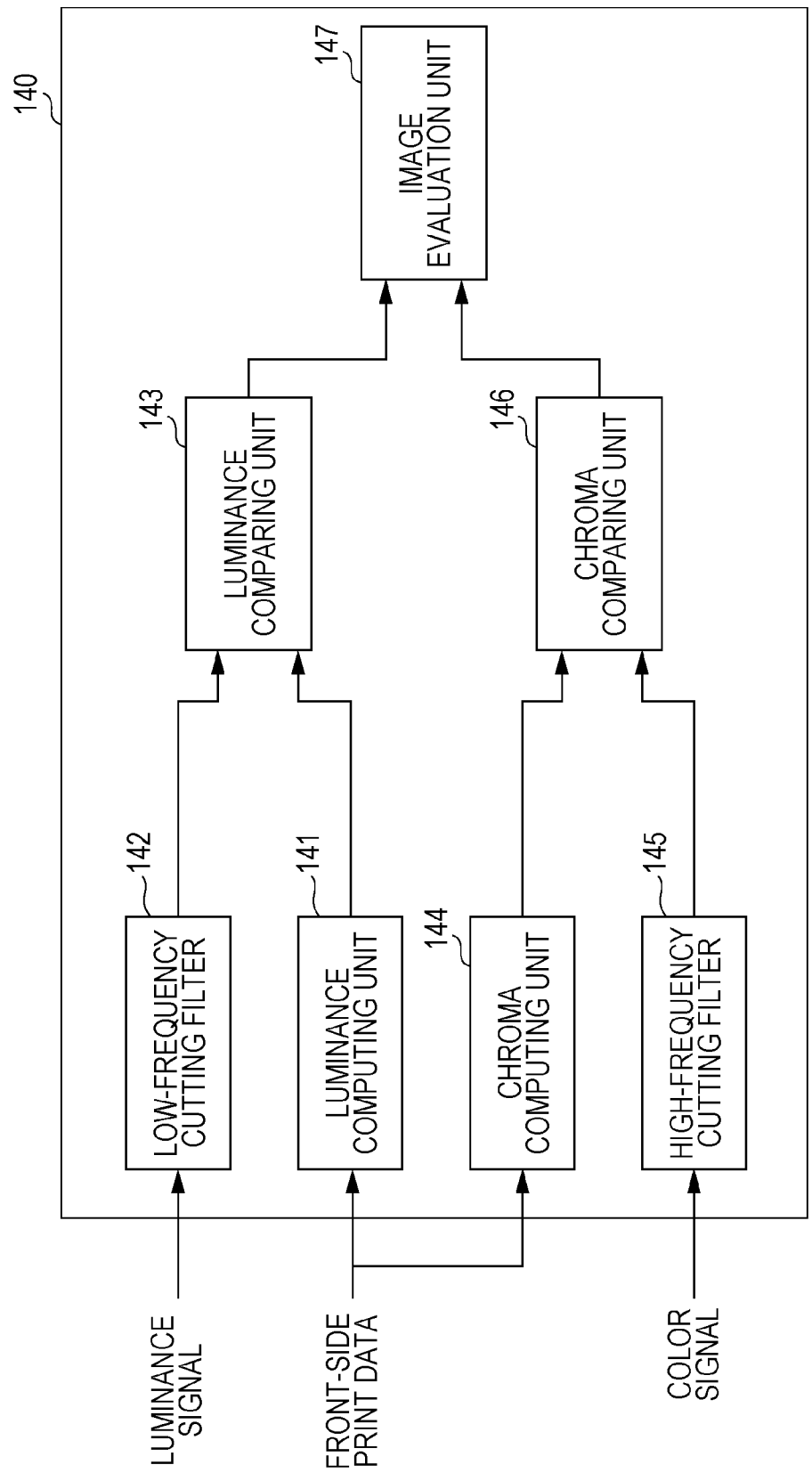
FIG. 9 is a diagram describing a processing device.

FIG. 9 is a diagram describing the processing device 140.

Hereinafter, the case in which an image on the front side of a sheet is evaluated will be described by way of example.

As illustrated in FIG. 9, the processing device 140 includes a luminance computing unit 141 as an example of a computing unit that receives front-side print data from the front-side buffer 132 of the pre-processing device 130 and computes the luminance of an image supposed to be formed, from the print data, on a sheet by the image forming apparatus 2, a low-frequency cutting filter 142 that receives a luminance signal from the monochrome sensor 113b of the reading device 100 and cuts low frequency components of the luminance signal, and a luminance comparing unit 143 as an example of a comparing unit that compares a luminance derived from the image read by the monochrome sensor 113b with the luminance computed by the luminance computing unit 141.

The processing device 140 further includes a chroma computing unit 144 as an example of a computing unit that computes the chroma of an image supposed to be formed, from the front-side print data, on a sheet by the image forming apparatus 2, a high-frequency cutting filter 145 that receives a color signal from the color sensor 113c of the reading device 100 and cuts high frequency components of the color signal, and a chroma comparing unit 146 that compares a chroma derived from the image read by the color sensor 113c with the chroma computed by the chroma computing unit 144.

The processing device 140 further includes an image evaluation unit 147 that evaluates an image formed by the image forming apparatus 2, on the basis of a luminance comparison result obtained by the luminance comparing unit 143 and a chroma comparison result obtained by the chroma comparing unit 146.

To evaluate an image on the back side of a sheet, instead of obtaining the front-side print data from the front-side buffer 132 of the pre-processing device 130, back-side print data is obtained from the back-side buffer 133 of the pre-processing device 130. However, the remaining configuration is the same or similar.

The luminance computing unit 141 computes the luminance of an image to be (or supposed to be) formed on a sheet by the image forming apparatus 2 from print data, as has been described above. At this time, it is preferable to compute a luminance that reflects spectral characteristics of the monochrome sensor 113b. That is, since the monochrome sensor 113b has different sensitivities (gains) with regard to the Y, M, C, and K colors, a luminance is computed by taking these characteristics into consideration. More specifically, when print data is composed of values of the Y, M, C, and K colors, the sensitivity ratio of each of these values is obtained in advance, and the sensitivity ratios are used to compute the luminance of the image.

For example, when the sensitivity ratio Sy of yellow (Y) is 0.3, the sensitivity ratio Sm of magenta (M) is 0.6, the sensitivity ratio Sc of cyan (C) is 0.7, and the sensitivity ratio Sk of black (K) is 1.0, and when luminance is P, the luminance P may be obtained using the following equation (1). In other words, a luminance is computed by setting a function that reflects spectral characteristics of the monochrome sensor 113b.

$$P = Sy \cdot Y + Sm \cdot M + Sc \cdot C + Sk \cdot K \quad (1)$$

The low-frequency cutting filter 142 reduces low-frequency components of an image, which tend to be an obstacle to evaluation of a line drawing, and serves a role of improving the accuracy of image evaluation.

The luminance comparing unit 143 compares the luminance obtained by the monochrome sensor 113b with the luminance computed by equation (1) or the like, and outputs the result as a matching score. In the exemplary embodiment, as a luminance comparison, for example, the absolute value of the difference between these two luminances is obtained. The absolute value of the difference is obtained for each section of one page formed by the image forming apparatus 2, and the sum total of these absolute values serves as a matching score.

In contrast, the chroma computing unit 144 computes the chroma of an image to be (or supposed to be) formed on a sheet by the image forming apparatus 2 from print data. At this time, it is preferable to compute a chroma while taking into consideration color characteristics of an image formed by the image forming apparatus 2. That is, when the Y, M, C, and K color toners are mixed, crosstalk occurs. Thus, a chroma is computed by taking these characteristics into consideration. More specifically, when print data is composed of values of the Y, M, C, and K colors, a function is obtained in advance on the basis of these Y, M, C, and K values, which expresses how the chroma of each of the R, G, and B colors becomes in accordance with the color characteristics of the image forming apparatus 2. From this function, the chroma of an image supposed to be formed on a sheet by the image forming apparatus 2 is computed.

Here, when chromas to be computed are Ri, Gi, and Bi, functions for obtaining these chromas are expressed as the following equations (2) to (4). In other words, chromas are computed by setting functions that reflect the color characteristics of the image forming apparatus 2.

$$Ri = fr(Y, M, C, K) \quad (2)$$

$$Gi = fg(Y, M, C, K) \quad (3)$$

$$Bi = fb(Y, M, C, K) \quad (4)$$

The high-frequency cutting filter 145 reduces high-frequency components of the read image. In the exemplary embodiment, an image formed on a sheet is read by the color sensor 113c while the image is in a defocused state. Thus, it is considered that high-frequency components of the image formed on the sheet are substantially removed. Note that, when the image formed on the sheet is read by the color sensor 113c at a resolution of, for example, 300 dpi, high-frequency components resulting from this cycle may be mixed in the read image. Therefore, the high-frequency cutting filter 145 is provided to reduce these high-frequency components in the exemplary embodiment.

The chroma comparing unit 146 compares the chromas obtained by the color sensor 113c with the chromas computed by equations (2) to (4) described above, and outputs the results as a matching score. In the exemplary embodiment, as a chroma comparison, for example, the absolute value of the difference between these two chromas is obtained for each of the R, G, and B colors. The absolute value of the difference is obtained for each section of one page formed by the image forming apparatus 2, and the sum total of these absolute values serves as a matching score.

In the above-described exemplary embodiment, the smaller the matching score output from the luminance comparing unit 143 or the chroma comparing unit 146, the closer the image actually formed by the image forming apparatus 2 to an image supposed to be formed, and the greater the matching score, the more different the image actually formed by the image forming apparatus 2 from an image supposed to be formed.

It is considered that matching scores output from the luminance comparing unit 143 are mainly the results of evaluation of an image of a line drawing such as a character. In contrast, matching scores output from the chroma comparing unit 146 are the results of evaluation of an image such as a color photograph where grayscale representation is performed.

In the exemplary embodiment, the image evaluation unit 147 weights luminance matching scores and chroma matching scores in accordance with the use of the sheet, and performs final evaluation of the image. In other words, the image evaluation unit 147 respectively weights the result of comparison between the luminance derived from the image read by the monochrome sensor 113b and the luminance computed by the luminance computing unit 141 and the result of comparison between the chroma derived from the image read by the color sensor 113c and the chroma computed by the chroma computing unit 144 in accordance with the use of the sheet, and evaluates the image.

More specifically, when the image formed by the image forming apparatus 2 is, for example, a print of a bill, what matters is whether a decimal point is accurately placed, or whether numerals are accurately printed. Thus, the evaluation of a line drawing becomes more crucial. Therefore, a luminance matching score is weighted more heavily than a chroma matching score, and these two matching scores are added. In another example, when an image formed by the image forming apparatus 2 is, for example, a print of a color photograph, a chroma matching score is weighted more heavily than a luminance matching score, and these two matching scores are added. When the sum exceeds a predetermined threshold, processing such as leaving a log to indicate an error is performed.

Figure 10:
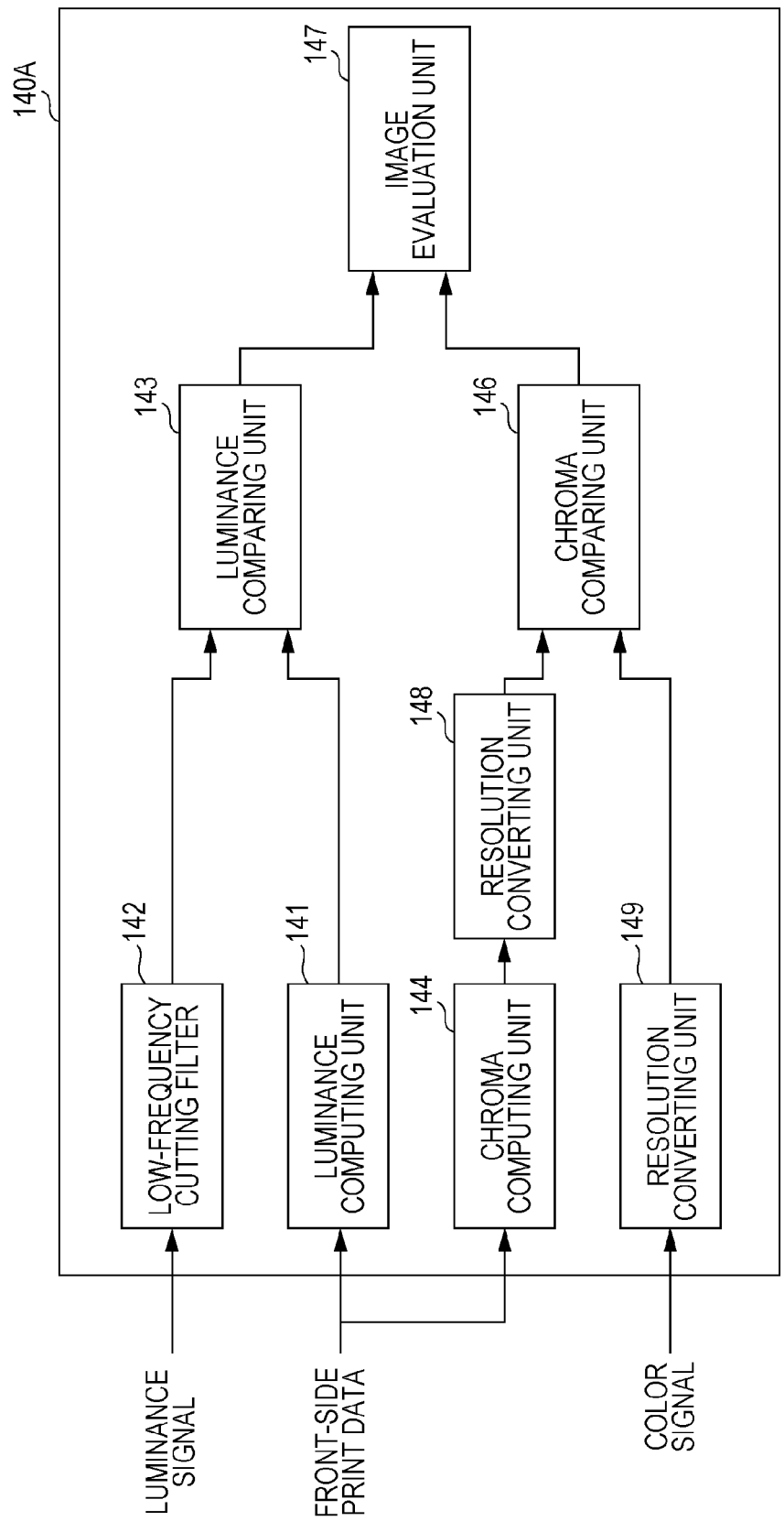
FIG. 10 is a diagram describing a processing device with another form.

FIG. 10 is a diagram describing a processing device 140A with another form.

Hereinafter, the case in which an image on the front side of a sheet is evaluated, as in FIG. 9, will be described by way of example.

The processing device 140A illustrated in FIG. 10 has a resolution converting unit 148 subsequent to the chroma computing unit 144, and has a resolution converting unit 149 in place of the high-frequency cutting filter 145, compared with the processing device 140 illustrated in FIG. 9.

With the processing device 140 with such a configuration, the accuracy of a matching score output from the chroma comparing unit 146 may further be improved. That is, when an image formed on a sheet is a color photograph or the like, coloring in minute ranges does not often matters; in most cases, what matters is coloring in larger ranges. That is, a person who looks at the image formed on the sheet determines whether the image is natural or not by looking at colors in a certain range. Thus, chroma evaluation is often suitably performed at a low resolution. Therefore, in the exemplary embodiment, the resolution converting units 148 and 149 convert print data or color signals of the front side into data at 150 dpi, and send the converted data to the chroma comparing unit 146, and the chroma comparing unit 146 compares chromas in a larger range.

<Description of Matching Score>

FIGS. 11A and 11B are diagrams describing the details of the method of computing a matching score by the luminance comparing unit 143 and the chroma comparing unit 146.

FIG. 11A illustrates a place, in print data, in which luminance or chroma comparison is desired to be performed. Here, it is assumed that the place is, for example, a region A in an image formed by the image forming apparatus 2. FIG. 11B illustrates a region A', in an image read by the monochrome sensor 113b or the color sensor 113c, which corresponds to the region A. The regions A and A' are regions that have a resolution of 300 dpi and that are within the range of 16 dots×16 dots.

Because the image read by the monochrome sensor 113b or the color sensor 113c is such that a transported sheet is tilted or placed incorrectly, the place of the region A' fluctuates according to each transported sheet, and the place of the region A' is not fixed. However, this fluctuation range is limited to a predetermined range. Therefore, in the exemplary embodiment, a region S is set as the fluctuation range, and the region A' is to be detected from the region S. Specifically, a region that has the same range as the region A' is sequentially selected from the region S (these selected regions are indicated as regions S1, S2, . . . in FIG. 11B), and luminances or chromas are compared between the region A and the regions S1, S2, . . . . A region with the smallest differences serves as the region A'. The absolute values of the differences serve as a matching score between the region A and the region A'.

This operation is repeated for the entire page of the sheet on which the image is formed by the image forming apparatus 2. Next, for example, a region B that is a region adjacent to the region A in FIG. 11A is compared with a region B' that is adjacent to the region A' in FIG. 11B, and the absolute values of differences between luminances or chromas serve as a matching score at this place. This operation is repeated for the entire page of the sheet, and all of these matching scores are added to obtain a matching score of the image formed on the sheet.

<Description of Operation of Post-Processing Apparatus>

Next, the operation of the post-processing apparatus 3 will be described.

Figure 12:
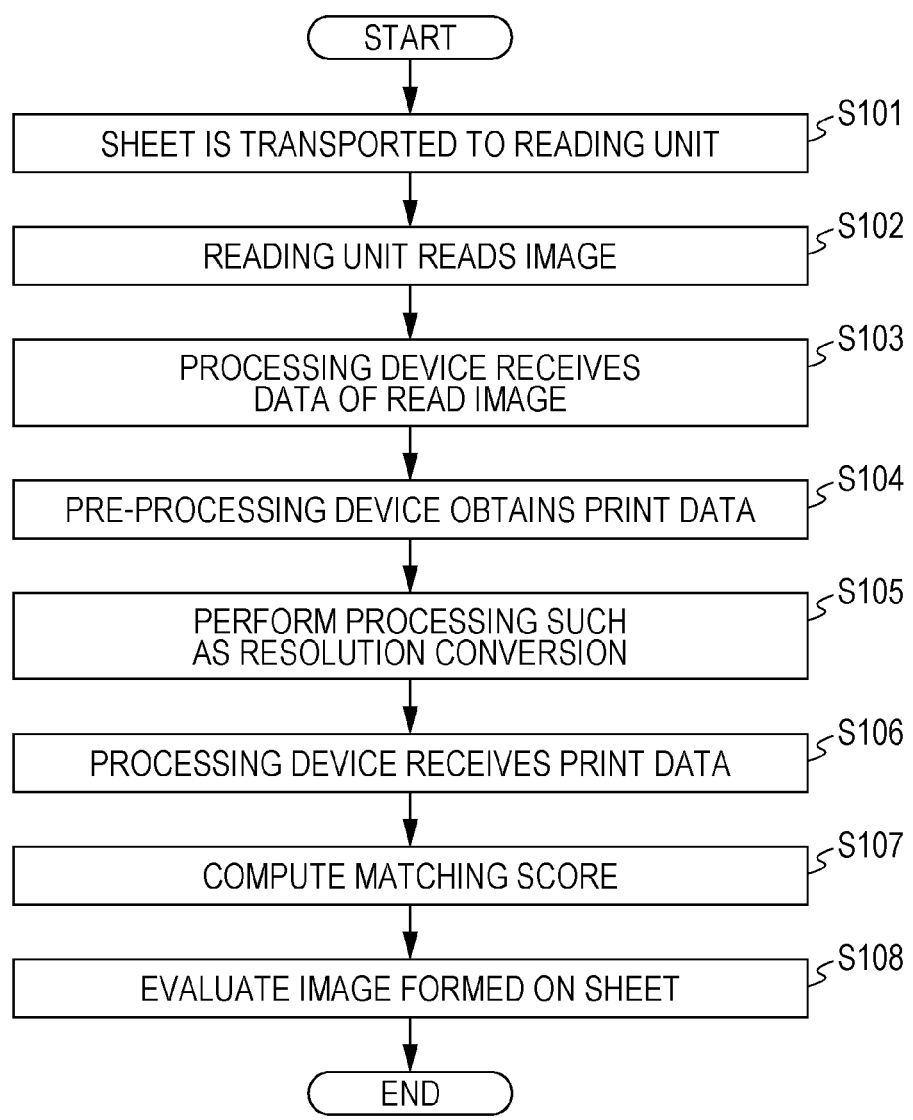
FIG. 12 is a flowchart describing the operation of the post-processing apparatus.

FIG. 12 is a flowchart describing the operation of the post-processing apparatus 3.

Hereinafter, the operation of the post-processing apparatus 3 will be described using FIGS. 6, 8, 9, and 12.

Upon transport of a sheet, on which an image is formed by the image forming apparatus 2, to the post-processing apparatus 3, the transport roll 151 transports the sheet to the reading device 100 (step S101). The sheet transported to the reading device 100 is read by the reading device 100, that is, an image on the front side is read by the front-side reading unit 110 and an image on the back side is read by the back-side reading unit 120 (step S102). Data of the images read by the monochrome sensors 113b and the color sensors 113c of the front-side reading unit 110 and the back-side reading unit 120 is transferred as luminance signals and color signals to the processing device 140, and the processing device 140 receives data of the read images (step S103).

In contrast, the pre-processing device 130 obtains print data from the image forming apparatus 2 (step S104), and performs processing such as resolution conversion or the like described using FIG. 8 (step S105). The pre-processing device 130 sends the print data to the processing device 140, and the processing device 140 receives the print data (step S106).

The processing device 140 performs luminance and chroma comparisons for the front side and the back side of the sheet by using the method described with reference to FIGS. 9, 11A, and 11B, and computes a matching score (step S107). On the basis of the matching score, which is the comparison result, the image evaluation unit 147 evaluates the image formed on the sheet (step S108).

In the above manner, the image formed on the sheet may be more accurately evaluated. Also, the image formed on the sheet may be more quickly evaluated, enabling real-time processing.

The above-described processing performed by the post-processing apparatus 3 is realized by cooperation between software and hardware resources. That is, a central processing unit (CPU) (not illustrated) in a control computer provided in the post-processing apparatus 3 executes a program for realizing the individual functions of the post-processing apparatus 3 and realizes these functions.

The processing performed by the post-processing apparatus 3 may be understood as a program that causes a computer to realize the following functions including: obtaining a luminance and a chroma, the luminance being derived by reading, by the monochrome sensor 113b in a focused state, an image formed on a sheet by the image forming apparatus 2 which performs grayscale representation of the image by forming dots on the sheet, the chroma being derived by reading the image by the color sensor 113c in a defocused state which is out of the focused state; obtaining print data that is information for the image forming apparatus 2 to form the image on the sheet; computing a luminance and a chroma of an image supposed to be formed on the sheet by the image forming apparatus 2 from the obtained print data; comparing a luminance derived from the image read by the monochrome sensor 113b with the computed luminance, and comparing a chroma derived from the image read by the color sensor 113c with the computed chroma; and evaluating the image formed by the image forming apparatus 2 in accordance with results of luminance and chroma comparison.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image evaluation apparatus comprising:
a reading unit that includes a monochrome detection unit and a color detection unit,
wherein the monochrome detection unit is arranged at a focused state and reads an image formed on a recording material by an image forming apparatus that performs grayscale representation of the image by forming dots on the recording material, and
wherein the color detection unit is arranged at a defocused state which is out of the focused state and reads the image;
an image information obtaining unit that obtains image information that is information for the image forming apparatus to form the image on the recording material;
a computing unit that computes a luminance and a chroma of an image supposed to be formed on the recording material by the image forming apparatus from the image information obtained by the image information obtaining unit;
a comparing unit that compares a luminance derived from the image read by the monochrome detection unit included in the reading unit with the luminance computed by the computing unit, and compares a chroma derived from the image read by the color detection unit with the chroma computed by the computing unit; and
an image evaluation unit that evaluates the image formed by the image forming apparatus, on the basis of results of comparison performed by the comparing unit,
wherein the image evaluation unit evaluates the image by weighting the result of comparison between the luminance derived from the image read by the monochrome detection unit and the luminance computed by the computing unit and the result of comparison between the chroma derived from the image read by the color detection unit and the chroma computed by the computing unit, in accordance with a use of the recording material.

2. The image evaluation apparatus according to claim 1, wherein the reading unit further includes a splitting unit that splits light emitted from a light source and then reflected from the recording material into light beams in two directions and that leads the split light beams to the monochrome detection unit and the color detection unit, and
wherein the monochrome detection unit enters the focused state and the color detection unit enters the defocused state, which is out of the focused state, by making an optical path length of the light beam led by the splitting unit to the monochrome detection unit different from an optical path length of the light beam led by the splitting unit to the color detection unit.

3. The image evaluation apparatus according to claim 2, wherein the reading unit includes an image-side telecentric optical system.

4. The image evaluation apparatus according to claim 1, wherein the reading unit includes an image-side telecentric optical system.

5. The image evaluation apparatus according to claim 1, wherein the monochrome detection unit is arranged at a position relative to the color detection unit such that high frequency components of the read image are removed thereby suppressing frequency interference of the dots formed on the recording material and a structure of CCD pixels.

6. An image forming system comprising:
an image forming apparatus that performs grayscale representation of an image by forming dots on a recording material; and
an image evaluation apparatus including:
a reading unit that includes a monochrome detection unit and a color detection unit,
wherein the monochrome detection unit is arranged at a focused state and reads the image formed on the recording material by the image forming apparatus, and
wherein the color detection unit is arranged at a defocused state which is out of the focused state and reads the image;
an image information obtaining unit that obtains image information that is information for the image forming apparatus to form the image on the recording material;
a computing unit that computes a luminance and a chroma of an image supposed to be formed on the recording material by the image forming apparatus from the image information obtained by the image information obtaining unit
a comparing unit that compares a luminance derived from the image read by the monochrome detection unit included in the reading unit with the luminance computed by the computing unit, and compares a chroma derived from the image read by the color detection unit with the chroma computed by the computing unit; and
an image evaluation unit that evaluates the image formed by the image forming apparatus, on the basis of results of comparison performed by the comparing unit,
wherein the image evaluation unit evaluates the image by weighting the result of comparison between the luminance derived from the image read by the monochrome detection unit and the luminance computed by the computing unit and the result of comparison between the chroma derived from the image read by the color detection unit and the chroma computed by the computing unit, in accordance with a use of the recording material.

7. A non-transitory computer readable medium storing a program causing a computer to execute a process, the process comprising:
obtaining a luminance and a chroma, the luminance being derived by reading, by a monochrome detection unit arranged at a focused state, an image formed on a recording material by an image forming apparatus that performs grayscale representation of the image by forming dots on the recording material, the chroma being derived by reading the image by a color detection unit arranged at a defocused state which is out of the focused state;
obtaining image information that is information for the image forming apparatus to form the image on the recording material;
computing a luminance and a chroma of an image supposed to be formed on the recording material by the image forming apparatus from the obtained image information;
comparing the luminance derived from the image read by the monochrome detection unit with the computed luminance, and comparing the chroma derived from the image read by the color detection unit with the computed chroma; and
evaluating the image formed by the image forming apparatus, in accordance with results of luminance and chroma comparison, wherein the evaluating the image comprises weighting the result of comparison between the luminance derived from the image read by the monochrome detection unit and the computed luminance and the result of comparison between the chroma derived from the image read by the color detection unit and the computed chroma, in accordance with a use of the recording material.

8. The non-transitory computer readable medium according to claim 7, wherein the luminance of the image supposed to be formed on the recording material by the image forming apparatus is computed using a function that reflects spectral characteristics of the monochrome detection unit, and wherein the chroma of the image supposed to be formed on the recording material by the image forming apparatus is computed using a function that reflects color characteristics of the image forming apparatus.

9. An image evaluation method comprising:

reading, by a monochrome detection unit arranged at a focused state, an image formed on a recording material by an image forming apparatus that performs grayscale representation of the image by forming dots on the recording material;

reading the image, by a color detection unit arranged at a defocused state which is out of the focused state;

obtaining image information that is information for the image forming apparatus to form the image on the recording material;

computing a luminance and a chroma of an image supposed to be formed on the recording material by the image forming apparatus from the obtained image information;

comparing a luminance derived from the read image with the computed luminance, and comparing a chroma derived from the read image with the computed chroma; and evaluating the image formed by the image forming apparatus, on the basis of results of comparison, wherein the evaluating the image comprises weighting the result of comparison between the luminance derived from the image read by the monochrome detection unit and the computed luminance and the result of comparison between the chroma derived from the image read by the color detection unit and the computed chroma, in accordance with a use of the recording material.

* * * * *